July 16, 1935.  A. E. HEATH  2,008,612
WINDING AND REELING DEVICE
Filed June 7, 1932  3 Sheets-Sheet 1
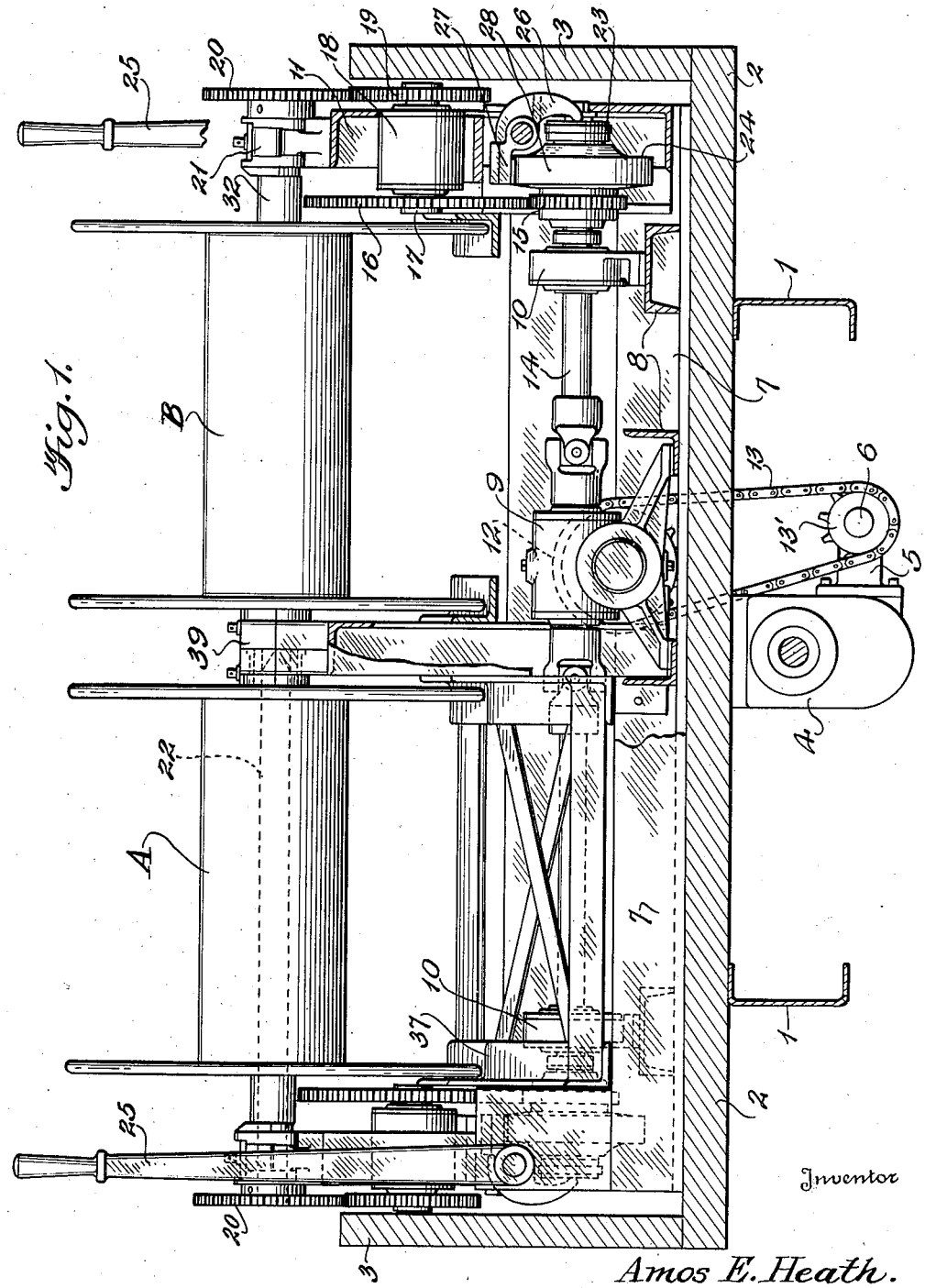
Inventor
Amos E. Heath.
By William C. Sinton, Attorney

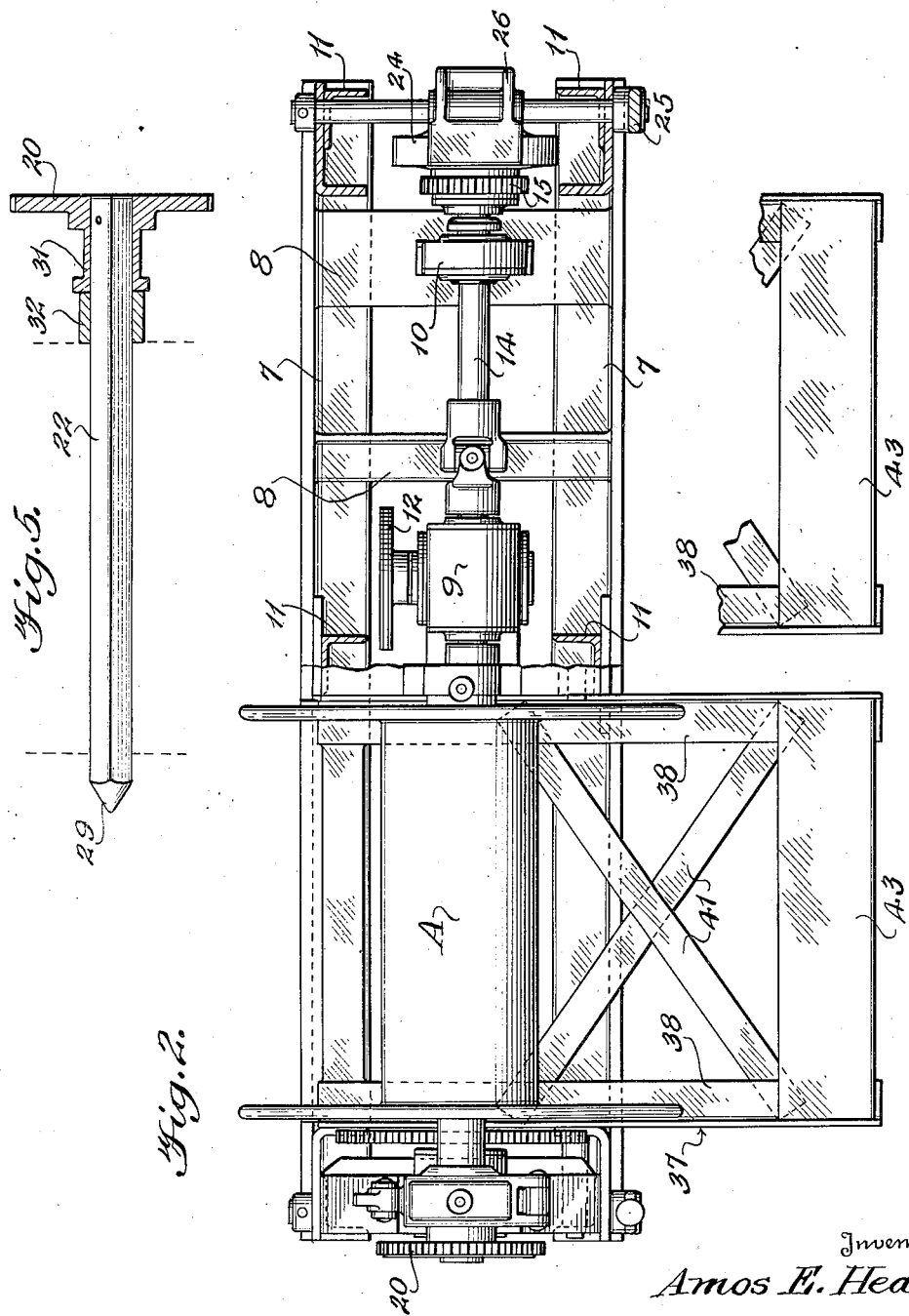

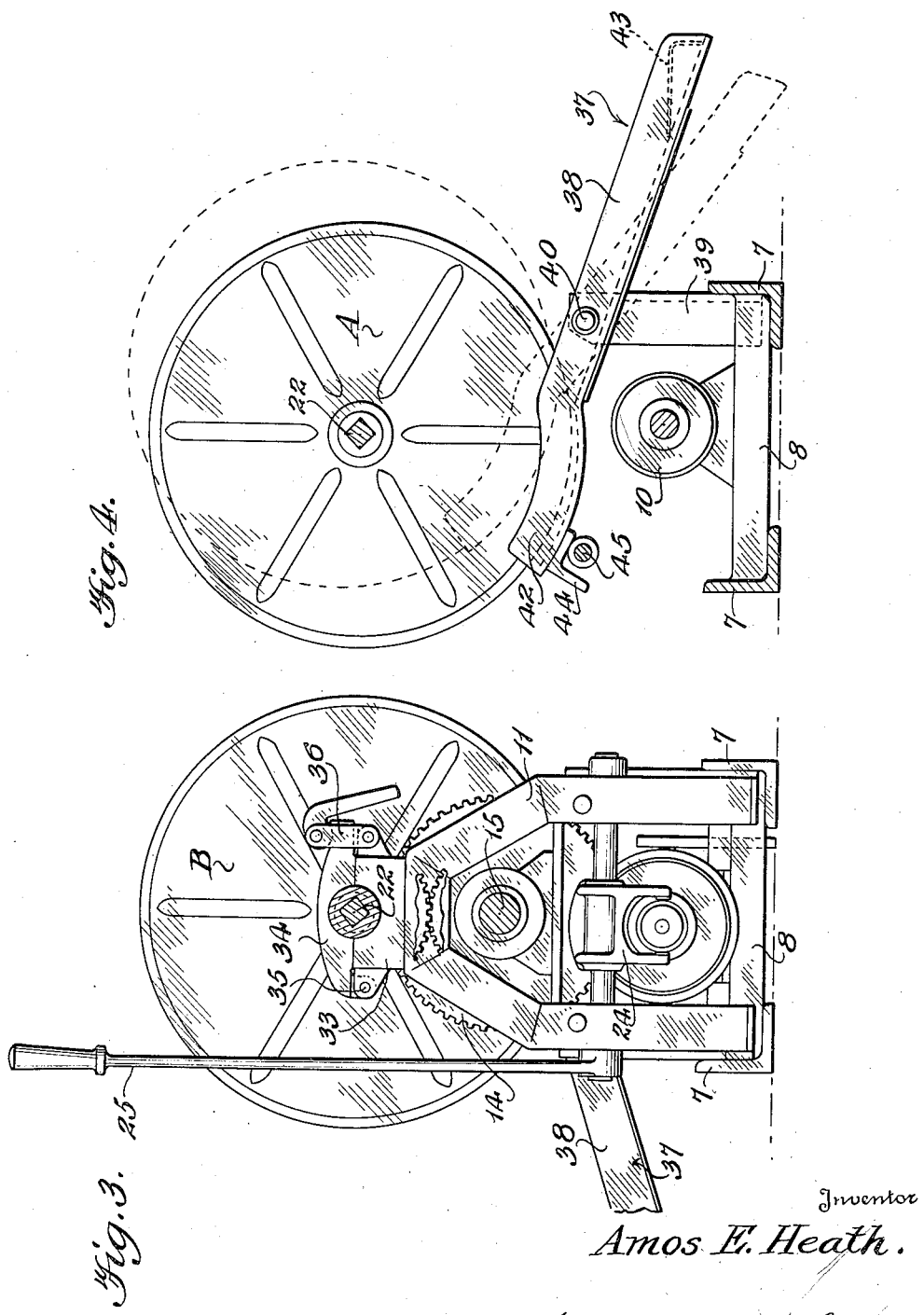

Patented July 16, 1935

2,008,612

UNITED STATES PATENT OFFICE 2,008,612

WINDING AND REELING DEVICE

Amos Edward Heath, Washington, D. C.

Application June 7, 1932, Serial No. 615,905

6 Claims. (Cl. 254—185)

The present invention relates to winding and reeling devices particularly adapted for the handling of electric, telephone and telegraph wires or cables, and primarily aims to provide a motor propelled apparatus capable of facilitating the laying of such wires or cables across country, along highways, or wherever it is desired to lay an appreciable length of wire or cable.

The invention is particularly advantageous in field artillery maneuvers for laying cables in the forward area. For this purpose, standard cables are usually received wound on reels of approximately one mile lengths. In laying a cable, the end thereof is anchored at the commanding post where signal corps headquarters are located, and the reel supported on a shaft is carried to the outpost or battery location, permitting the cable to unwind from the reel during transportation thereof.

The practice heretofore followed in this particular art, involves considerable labor, time and difficulty, and accordingly, the performance of the operation incurs unnecessary expense and proved to be costly without reason. Consequently, it is amongst the most important features of the invention to provide a device of the character mentioned adapted to greatly simplify the operations necessary in laying the wires or cables, and materially lessen the difficulties heretofore encountered in the performance of such operations.

It is an equally important object of the invention to provide a wire or cable handling apparatus capable of being easily and readily installed upon standard trucks or other motor driven vehicles, requiring but a comparatively limited space so that the truck or vehicle may still be used for transporting purposes.

Another meritorious feature of the invention resides in the provision of a wire or cable handling apparatus wherein may be provided a plurality of reels operatively associated with the driving mechanism of a truck or the like, and which through operation of a clutch arrangement, said reels may be separately or simultaneously actuated.

The invention also contemplates the provision of an equipment of the type set forth including means which may be selectively set in operation to control the wires or cables, or to partly re-reel the latter, or in short, to perform any useful function as necessity or preference may dictate in the performance of wire or cable laying.

It is also among the desired objects of the invention to provide a wire or cable handling device, having means whereby the reels may be readily and quickly set in position or replaced for operation so that the time required in the performance of such operations will be materially reduced and the labor incident to the operations greatly lessened.

Other important objects and advantages of the invention will be in part obvious and in part pointed out hereinafter.

In order that the invention and its mode of operation may be readily understood by those persons skilled in the art, I have in the accompanying drawings and in the detailed description based thereupon, set out a possible embodiment of the same.

In these drawings:

Figure 1 is a front elevation of my improved device with parts broken away;

Figure 2 is a plan of the device with parts removed to show the mechanical construction of the operating elements of said device;

Figure 3 is an end elevation of the winding and reeling apparatus;

Figure 4 is a detail of the lifting and positioning of the reel for operation; and Figure 5 is a detail of the reel supporting shaft embodied in the present invention.

Having more particular reference to the drawings wherein like characters of reference designate corresponding parts throughout, I have shown therein a portion of a motor driven truck chassis comprising channeled side beams 1 upon which is mounted the body of the truck, said body being of the open type and comprising a floor 2 and side panels 3.

The motor truck is provided with the usual transmission housing 4 carrying at the side thereof a casing 5 enclosing the power take-off. This power take-off is provided with a drive shaft 6 which, at times, may be connected with the transmission gearing arranged within the housing 4 to the power plant of the motor truck, whereby power may be transmitted to said drive shaft 6.

Arranged within the forward portion of the truck body between the side panels 3 thereof, is a frame consisting of a base formed from a pair of parallel L-beams 7 connected together by means of suitable cross beams 8. This base is suitably secured to the floor 2 of the truck body 50 and supports a gear housing 9 as well as a pair of self-alining bearings 10 each disposed at either side of said housing 9 in spaced relation thereto. The gear housing 9 is provided with suitable gearing, whereby power may be transmitted from the drive shaft 6 of the power take-off to drive the wire or cable reels A and B supported above the housing 9 by means of upright frames 11 fixed to and extending from the base hereinbefore described.

In order to effect the connection between the power take-off and the reels A and B, a sprocket wheel 12 extends to one side of the gear housing 9 and engages a chain 13 which in turn engages a sprocket gear 13' fixed to the shaft 6 of the power take-off, whereby with rotation of the latter, the sprocket wheel 12 will also rotate therewith, thus transmitting power to the gearing within the housing 9. At this point, it will be understood that through the take-off connection and gearing shown, said drive shaft 6 may be driven in opposite directions or at various speeds and the sprocket gear 13' will follow the movement of said shaft 6. Extending from either side of the gear housing 9 and supported by the self-alining bearing 10 is a universal shaft 14 adapted to be driven by the gearing in said housing 9. Upon the free end portion of the universal shafts 14 is loosely mounted a pinion 15 in mesh with a gear 16 carried by one extremity of a stub shaft 17 supported in a double bearing 18 suitably mounted in the end upright frames 11. The other extremity of the stub shafts 17 carries a pinion 19 meshing with a spur gear 20 arranged in a bearing 21 disposed upon the upper portion of the upright frames 11. The gear 20 is connected to the reel supporting shaft 22 in a manner to be more fully described hereinafter.

The end of the universal shafts 14 fixedly carry the driving member 23 of a friction clutch, adapted to engage the driven member 24 of said clutch which is preferably formed integral with the pinion 15. In this manner, it will be understood that with actuation of the clutch, the gearings between the universal shafts 14 and the reel shafts 22 will operate to drive the reels A and B. A hand lever 25 is provided and has connection through a pressure applying finger 26 with the driving clutch member 23 to move the same in clutch engaging position when said lever 25 is moved to one of its positions. The hand lever 25 is also adapted when moved in its other position to actuate a drag brake 27 for engagement with the peripheral portion 28 of the clutch driven member 24 to control the free movement of the reels A and B.

The reels A and B generally having a bore extending centrally throughout the length thereof, are supported in operative position by means of a square shaft 22 extending through said bore and removable therefrom. One end of the shaft 22 is preferably pointed as indicated at 29 in the drawings to facilitate its engagement with the center bearing 39. The other end of the shaft 22 has suitably keyed thereto the gear 20 which is formed with an inwardly directed bearing sleeve 31 for locking engagement with the bearing 21. A bushing 32 is positioned adjacent the sleeve 31 and adapted to provide for the snug engagement of the reels upon the shaft 22.

The bearings 21 are of the split type and as more clearly shown in Figure 3 of the drawings, each comprises a lower stationary section 33 and an upper section 34 which latter is hinged at 35 to the lower section 33. The free end of the lower bearing section 33 is provided with a cam and link clamp 36 for detachably connecting said lower section to the upper section 34 of the bearing, whereby when the hinged sections of the bearings are released, easy removal of the reels may be effected.

In order to facilitate the handling of the reels for their placement in or removal from operative position in the bearings, and also to facilitate the lifting of the reels for the introduction or withdrawal of the shafts 22 therefrom, the device is provided with a skid 37 formed of a pair of paralleling angle bars 38 pivoted to a support 39 as indicated at 40, and forming an adequate trackway for the reel heads. The bars 38 are interconnected and reinforced by means of cross bars 41 and have their normal rearward ends 42 curved to conform to the reel heads for proper engagement therewith. The forward ends of the bars 38 are provided with a treadle plate 43, so that the operator of the device may step on said plate 43 to raise the reels in the manner illustrated in dotted lines in Figure 4 of the drawings. The curved ends 42 of the bars 38 are normally urged downwardly away from the adjacent peripheral portion of the reel heads by means of a weighted member 44 secured to the under side of said ends 42, and the downward movement of the skid ends 42 is limited by a stop rod 45 positioned adjacent said ends 42 and suitably supported on the frame of the apparatus.

From the foregoing description, it will be understood that my improved winding and reeling device may be readily mounted on the body of a truck and still leave ample room to transport other equipment such as a gun, ammunition, additional cable reel, telephone and telegraph receiving and transmitting apparatus, or the like.

In using the device, the reels are easily handled by rolling the same up the skid 37 until the reel heads rest in the curved ends 42 of the angle bars 38, and upon standing on the treadle plate 43, the reels are supported adjacent the end and center bearings so that the shaft 22 carrying the gear 20 may be placed readily in position, whereupon the skid 37 is permitted to return to its normal position so that the bearing sleeve 30 of gear 20 will fall in said end split bearing which has been opened. The pivoted section 34 of the split bearing is thereupon moved to its closed position and locked by the cam and link connection 36. The device is then ready for operation, and it will be appreciated that with the clutch 23 in its disengaged position, the reels will be supported freely in the bearings so that the cable may be unwound from the reels. The free rotation of the reels, however, may be controlled by application of more or less pressure through the medium of the drag brake 27 so that the proper amount of slack may be had in laying the cables. If it is desired to take up on the cable or to rewind the same, this may be readily done by throwing the clutch in engaging position, whereupon power will be transmitted to the reels through the connecting gearing.

In removing the reels, the end bearings are unclamped and opened, then upon stepping on the treadle plate 43, the skid 37 will lift the reels to take the weight thereof in the manner shown in Figure 4 of the drawings. The shaft 22 may then be withdrawn from the reel which is rolled down the skid to the body of the truck.

Manifestly, the construction shown and described is capable of considerable modification and such modifications which come within the scope of my claims, I consider within the spirit of my invention.

I claim:

1. In an apparatus of the character described, a frame, bearings carried by the frame, interchangeable reels, a shaft removably engaged with said reels for supporting the same in said bearings, a skid on the frame for supporting the reels to engage the shaft within the latter and place the same in its bearings, and means acting on said skid to normally urge the same out of engagement with the reels.

2. In an apparatus of the character described, a frame, bearings carried by the frame, interchangeable reels, a shaft removably engaged with said reels for supporting the same in said bearings, a skid on the frame for supporting the reels to engage the shaft within the latter and place the same in its bearings, means acting on said skid to normally urge the same out of engagement with the reels, and a stop for limiting the movement of the skid.

3. In a device of the character described comprising a support, a reel detachably mounted upon said support, power driven means arranged upon said support, manually operable means for connecting at times said power driven means with said reel, reel alining means connected to and mounted upon said support, and a treadle formed with said reel alining means whereby the weight of an operator may be employed for moving said treadle into engagement with said reel.

4. A winding and reeling device comprising a base capable of being installed upon the body of a motor truck, a reel detachably mounted upon said base, power driven means, means for operatively connecting said power driven means with said reel when the latter is mounted upon the base, a reel alining means, said reel alining means consisting of a frame pivotally mounted upon said base, trackways formed with said frame upon which said reel may roll, a weight formed with one end of said frame, and a treadle formed with the opposite end of said frame, substantially as and for the purpose specified.

5. A winding and reeling device comprising in combination a supporting frame consisting of a base, uprights mounted upon said base, a reel removably mounted within said uprights, bearings mounted within said base, a driven shaft journalled within said bearings, a gear wheel loosely mounted upon said shaft, and means for operatively connecting said gear with said reel, a clutch arranged upon said shaft having one member thereof connected to said shaft and the other member thereof connected to said gear wheel, a drag brake carried by the clutch member connected to said gear wheel and a manually operable lever for jointly controlling said drag brake and clutch.

6. A winding and reeling device comprising a frame consisting of a base, uprights secured to and extending from said base, bearings mounted upon said uprights, a reel journalled within said bearings, bearings supported upon said base, a driven shaft journalled within the bearings supported upon said base, transmission gearing mounted within one of said uprights and operatively connected to said reel, a gear loosely mounted upon said driven shaft and operatively connected to said transmission gearing, and a combined clutch and brake mechanism for operatively connecting said gear with said driven shaft.

AMOS EDWARD HEATH.